UNITED STATES PATENT OFFICE.

CHRISTIAN F. HAHN AND THOMAS F. WILLIAMSON, OF QUITMAN, MISSISSIPPI.

BELT-DRESSING.

1,180,392.           Specification of Letters Patent.      Patented Apr. 25, 1916.

No Drawing.      Application filed April 3, 1915.   Serial No. 19,063.

*To all whom it may concern:*

Be it known that we, CHRISTIAN F. HAHN and THOMAS F. WILLIAMSON, citizens of the United States, residing at Quitman, in the county of Clarke and State of Mississippi, have invented new and useful Improvements in Belt-Dressing, of which the following is a specification.

Our invention relates to a composition for dressing leather or rubber belting, and its object is to provide a composition which is comparatively inexpensive of manufacture, capable of being easily and conveniently applied, and adapted to prolong the life and increase the flexibility of the belt.

In carrying our invention into practice for the production of a dressing for leather belts, we employ a composition of black molasses, one gallon, paraffin, one-fourth of a pound, pure distilled pine rosin, one-fourth of a pound, and beef tallow, one-half pound, or neat's-foot oil, one-half pint. This composition is adapted for use as a dressing for rubber belting by dispensing with the fat or oil and using the other ingredients specified.

In practice the composition is applied to the surface of the belt and thoroughly rubbed in, and it serves to render the belt soft and flexible, to relieve the belt of all tendency to brittleness, to protect the belt to a high degree from water and the action of the air, and to lubricate the portions of the belt so as to reduce the tendency to fracture due to the flexion of the belt when in use. The composition minus the beef tallow or neat's-foot oil will also be found highly efficient as a preservative for rubber belts, to protect the same from the action of the air, to seal the pores of the belt and render the same more durable and flexible and to diminish or retard the tendency of the rubber to harden.

In preparing the composition, the molasses is heated to a sufficient temperature to form an intimate mixture with the paraffin and rosin, as well as the tallow, if used, the molasses serving as a preservative vehicle, which is prevented from fermenting by the paraffin and rosin, which act mutually upon one another as blending agents, whereby the composition is kept in a liquid condition for use.

The composition also has the advantage of increasing the gripping and traction power of the belt, so that it may run slack without slipping on the drive wheels or pulleys, thus reducing friction and increasing the durability of the belt, as it is a known fact that a slack belt will last longer than a tight one.

We claim:—

1. A composition for use in dressing belts comprising black molasses, about one gallon, paraffin, about one-fourth of a pound, and pure distilled pine rosin, about one-fourth of a pound, the paraffin and rosin being intimately mixed with the molasses.

2. A composition for use in dressing belts comprising black molasses, about one gallon, paraffin, about one-fourth of a pound, pure distilled pine rosin, about one-fourth of a pound and an animal fat or oil, about one-half pound.

In testimony whereof we affix our signatures in presence of two witnesses.

CHRISTIAN F. HAHN.
    THOMAS F. WILLIAMSON.

Witnesses:
    R. W. HEEDELBERG,
    WM. EDWARDS.

Copies of this patent may be obtained for five cents each, by addressing the "Commissioner of Patents, Washington, D. C."